3,326,875
SEPARATION OF LARGE POLYMER MOLECULES IN SOLUTION
John C. Moore, Lake Jackson, Tex., assignor to The Dow Chemical Company, Midland, Mich., a corporation of Delaware
No Drawing. Filed Jan. 31, 1963, Ser. No. 255,189
17 Claims. (Cl. 260—92.8)

This invention relates to the separation of large molecules in solution and more particularly relates to the separation of high molecular weight materials by means of polymer gels.

A wide variety of means have been employed to fractionate solutions of polymeric materials, particularly where it is desired to determine the molecular weight distribution of the polymer in solution. Methods such as ultracentrifugation and fractional precipitation of a polymeric material from solution have all been utilized to determine or approximate the molecular weight distribution of a soluble polymeric material. Many of these techniques are time-consuming, require expensive and intricate equipment and often times the results obtained from such methods are substantially less than desired.

It is therefore an object of this invention to provide an improved method for the separation of various molecular weight fractions from a solution of a polymer.

It is a further object of this invention to provide a method which permits a precise separation of such polymer fractions.

It is a still further object of this invention to provide an analytical method whereby the molecular weight distribution of various species within a given homopolymer sample can be determined.

It is yet another object of this invention to provide a means of comparing sizes of polymer molecules which differ generically.

Yet other objects of this invention will become apparent from the description set forth in the following specification and examples.

These features and other advantages in accordance with the invention are obtained by utilizing a packed bed of a non-polar polymeric material having a controlled and selected heteroporosity, forcing a non-aqueous solution of a polymeric material to be fractionated through the packed bed by means of an eluting solvent and determining, by suitable means, the quantity of polymeric material removed in various fractions of the solvent used. The polymeric material used to pack the column in the practice of the invention is selected from those polymers which are insoluble in the solvent being used and have a heteroporous structure. The heteroporous polymeric bodies have a plurality of fine interconnecting cells having an effective diameter of from about 2 to about 2000 millimicrons. The heteroporous polymers are readily prepared by polymerization of a wide variety of monomeric materials. The polymeric packing material useful in the practice of the invention can have a range of porosity which includes all or any part of the above range in order to accomplish the fractionation of a given polymer sample. Suitable non-polar heteroporous polymers for the practice of the invention are described in United States patent application Ser. No. 253,084, filed Jan. 22, 1963, by T. Alfrey, Jr., and W. G. Lloyd.

In preparing polymers for the practice of the present invention, generally it is desirable that they contain at least about 10 mole percent of difunctional cross linking agent, if the vinyl type polymers are being employed. Utilization of sufficient quantity of the cross linking agent or difunctional monomer results in a polymer that is mechanically relatively strong, does not crush in use and the pores or openings within the polymer have little or no tendency to collapse. The rigid porous polymers may exhibit some tendency to swell slightly in certain solvents, but this is not harmful so long as the gel structure remains rigid enough not to deform under the pressures used to pack and operate the column and so that a useful flow of eluting solvent can be maintained. It is generally desirable to use a finely divided porous resin in order to assure adequate and intimate contact of the resin solution with the porous resin. Such polymers should be ground to a relatively small size for maximum effect. Generally if the rigid porous polymer is in the form of particles sufficiently small to pass a 140 mesh (U.S. Sieve size) screen, satisfactory separation will take place. Most advantageously for many applications the ground polymers should pass through a 325 mesh (U.S. Sieve size) screen. The particle size of the porous resin and method of packing will generally determine the head necessary to force the solution through the column and the maximum rate at which it should pass through. Thus a column composed of small particles will require a higher pressure and give a better separation than a column of similar dimensions having larger resin particles within the column and operated at a similar flow rate. Generally it is beneficial to grind the porous polymer and carefully deposit it in the column as a dilute suspension by adding to the column a sufficient quantity of the suspension to pack it to the desired depth. Frequently it is beneficial to pass through a quantity of the solvent after the bed has been laid down to assure uniform packing and prevent channeling.

A preferred method of practicing the present invention is to use spherical beads of the polymers prepared by suspension polymerization in the desired size range. The advantages of using spherical polymer beads over the use of irregularly shaped polymer particles of the same polymer include the ability to closely grade the spheres easily with a minimum of processing. These spheres when packed into columns give less pressure drop per unit length of column.

It is desirable in the preparation of these polymers that at no time during the preparation the polymer particles be allowed to dry out. If this happens the porous structure may be changed so that reswelling does not restore the original volume. The solvent wetting the polymer can be replaced with another as desired by flushing the particles in a filter or in the bed with a miscible solvent or a series of miscible solvents.

Operating temperature of the column is usually not critical. Temperatures of 100 degrees C. and higher may be employed so long as they do not affect the dimensional stability of the polymer gel employed and are not above the boiling point of the solvent at the operating pressure. Likewise, temperatures below room temperature may be employed so long as the polymer remains in solution and the polymer solution does not become excessively viscous. In general, however, room temperature and above are most advantageous.

The method of the present invention has its greatest novelty and utility in the separation of high polymers into fractions, although it also is able to separate these high polymers from those of lower molecular weight and from non-polymeric materials. By high polymers we mean to include those polymers containing molecular species having molecular weights of from about 100,000 up to several million.

In the lower molecular weight ranges the method of the present invention provides an improved process in which better separation between polymer species in a narrow molecular weight distribution range is achieved in a substantially shorter time.

The present invention is further illustrated but not limited by the following examples:

Example 1

A reaction vessel was charged with a suitable quantity of a mixture containing 45 percent by weight ethyl styrene and 55 percent by weight divinyl benzene together with 0.100 percent of benzoyl peroxide based on the total weight of the monomer mixture. To 20 parts of the monomer and catalyst mixture there was added 80 parts of diethylbenzene as a diluent. The reaction vessel was purged with nitrogen in sufficient quantity to remove at least the major portion of the air present. The vessel was then sealed and polymerization was conducted at a temperature of 75 degrees C. for 48 hours and 120 degrees C. for a further 48 hours. The resultant polymer was separated, wet-ground in a Waring Blendor to pass a 200 mesh U.S. Sieve size screen and be retained on a 325 mesh U.S. Sieve size screen. The ground polymer was placed in a stainless steel tube having an internal diameter of 0.305 inch and length of about 4 feet. The tube was packed by introducing a slurry of the ground polymer in toluene and depositing the polymer into a tightly packed bed by pressure filtration according to well-known practice. Toluene was pumped through for a period of 2 hours at a pressure of 25 pounds per square inch to wash the bed. A polymer solution was prepared by dissolving equal partions of 2 polystyrene samples, one having an average molecular weight of 82,000 and the other having an average molecular weight of 267,000 to form a 2% by weight solution of polymer in toluene. The polystyrenes were relatively homogeneous fractions having a ratio of weight average to number average molecular weight of 1.05 for the low molecular weight material and 1.08 for the higher molecular weight material. One quarter of a milliliter of this solution was placed at the input end of the column and was eluted by pumping toluene through the column at a rate of about 100 milliliters per hour. The effluent toluene passed through the column and was continuously monitored by means of a recording refractometer. It was found that the polymer having a molecular weight of 82,000 showed a maximum concentration at 39.3 milliliters and was completely removed by the column when 43.6 milliliters had passed through. The 267,000 molecular weight polystyrene first appeared when 27.9 milliliters had been eluted through the column and showed a maximum concentration at 33.1 milliliters.

Example 2

A column was prepared utilizing the heteroporous polymer of Example 1 which had been wet ground to be retained on a 500 mesh U.S. Sieve size screen and to pass a 325 mesh U.S. Sieve size screen. The column was prepared by packing 3 sections of stainless steel tubing having an inside diameter of 0.305 inch, each section of the tubing being about 4 feet in length. These three sections of tubing were then joined together with connectors of 0.02 inch I.D. to provide a packing length of about 12 feet. After flushing the column with toluene a one milliliter sample which contained a total of 1⅓ percent by weight of equal parts of polystyrene samples used in Example 1 was added to the inlet end of the column. The column was eluted with toluene under a pressure of 76 pounds per square inch gauge which resulted in a flow rate of about 26.4 milliliters per hour. The higher molecular weight polystyrene in the toluene passing from the column was first indicated after 75 milliliters had passed through, showed a maximum concentration at 89.5 milliliters and was no longer observed at 99 milliliters. The lower molecular weight polystyrene was first observed at 99 milliliters, showed a maximum of 108.6 milliliters and was no longer present at 125 milliliters.

Example 3

The procedure of Example 2 was repeated with the exception that the pressure was reduced to 38 pounds per square inch gauge which resulted in a flow rate of about 12.4 milliliters per hour. The results obtained were identical.

A variety of porous polymer compositions were prepared in a manner substantially similar to that described in Example 1 with the exception that various diluents were employed. The upper limit of molecular weight of polystyrene which would be delayed by virtue of its permeation into the particles were determined, i.e., the porous polymer was useful for separation of polymers having a molecular weight lower than the molecular weight limit of permeability. Typical gels, their compositions and permeability limits are set forth in the following table of examples:

TABLE I

| Example | Percent Diluent | | Percent Monomer | Percent Cross-linker | Mol. Wt. Limit of Permeability | Percent Penetration of $1 \times 10^6$ mol. wt. |
|---|---|---|---|---|---|---|
| | Toluene | | Styrene | DVB* | | |
| 4 | 60 | | 30 | 10 | 6,000 | |
| 5 | 60 | | 30 | 10 | 7,000 | |
| 6 | 80 | | 9 | 11 | 250,000 | |
| | Diethylbenzene | | | | | |
| 7 | 60 | | 30 | 10 | 12,000 | |
| 8 | 60 | | 30 | 10 | 30,000 | |
| 9 | 80 | | 9 | 11 | 300,000 | |
| | Isoamyl Alcohol | Diethyl Benzene | | | | |
| 10 | 20 | 40 | 30 | 10 | 36,000 | |
| 11 | 36 | 24 | 30 | 10 | $>3.5 \times 10^6$ | 25 |
| 12 | 40 | 20 | 30 | 10 | $>3.5 \times 10^6$ | 30 |
| 13 | 40 | 20 | 30 | 10 | $>3.5 \times 10^6$ | 55 |
| 14 | 46.7 | 13.3 | 30 | 10 | $>3.5 \times 10^6$ | 70 |
| 15 | 53.3 | 6.7 | 30 | 10 | $>3.5 \times 10^6$ | 94 |

*Divinylbenzene.

TABLE I—Continued

| Example | Percent Diluent | | Percent Monomer | Percent Cross-linker | Mol. Wt. Limit of Permeability |
|---|---|---|---|---|---|
| | Toluene | Diethylbenzene | Styrene | DVB | |
| 16 | 45 | 15 | 30 | 10 | 9,000 |
| 17 | 45 | 15 | 30 | 10 | 14,000 |
| 18 | 30 | 30 | 10 | 30 | 15,000 |
| 19 | 40 | 20 | 30 | 10 | 18,000 |
| | | n-Dodecane | | | |
| 20 | 45 | 15 | 30 | 10 | 100,000 |
| 21 | 30 | 30 | 30 | 10 | 300,000 |
| 22 | 15 | 45 | 30 | 10 | $2 \times 10^6$ |
| | Isoamyl alcohol | | | | |
| 23 | 60 | | 30 | 10 | $>3.5 \times 10^6$ |
| | Tricresyl phosphate | | | | |
| 24 | 60 | | 30 | 10 | [1]>30,000 [2]>80,000 |
| | Cyclohexane | | | | |
| 25 | 60 | | 30 | 10 | 150,000 |
| | 2-Ethyl hexanol | Diethylbenzene | | | |
| 26 | 24 | 36 | 30 | 10 | 350,000 |

[1] Polyglycol.
[2] Polystyrene.

Example 27

Mixtures of various materials were added to the column of Example 5 utilizing tetrahydronapthalene as a solvent or carrier. The mixture consisted of propylene glycols having an average molecular weight of about 2,000 and tripropylene glycol. The polypropylene glycol of 2,000 molecular weight appeared at about 25 milliliters of eluant, reached a maximum at about 32 milliliters and was completely eluted at about 37 milliliters. The tripropylene glycol was observed at about 38 milliliters, reached a maximum at about 41 milliliters, and was not observed after about 49 milliliters.

Example 28

In the same column as Example 27 another mixture consisting of polystyrene (82,000 M.W. used in Example 1), a polypropylene glycol of 750 M.W. and acetone dissolved in tetrahydronaphthalene, was eluted with more of the tetrahydronaphthalene. The polystyrene appeared at about 21 milliliters of eluant, reached a maximum at about 25 milliliters and was completely eluted at 28 milliliters. Next appeared the polyglycol at about 28 milliliters, its maximum was at about 36 milliliters and it was completely eluted at about 42 milliliters. Finally the acetone appeared at about 43 milliliters, reached its peak at 47 milliliters and was completely eluted at 53 milliliters.

Example 29

A column was prepared utilizing suspension-polymerized beads of a heteroporous polymer prepared by crosslinking 30 parts of styrene with 10 parts of divinylbenzene in the presence of 45 parts n-dodecane and 15 parts toluene as reaction diluents. The column was composed of 3 sections of stainless steel tubing having an inside diameter of 0.305 inch, each section of the tubing being about 4 feet in length. These three sections were joined together with connectors of 0.02 inch I.D. to provide a packing length of about 12 feet. The tubing section provided with the sample inlet was packed with the 200–325 mesh (U.S. Sieve size) polymer and the remaining two sections were packed with the 140–200 mesh (U.S. Sieve size) polymer. After flushing the polymer with o-dichlorobenzene, a one milliliter sample which contained 1⅓ percent by weight of polyethylene was added to the inlet end of the column. The column was operated at 100 degrees C. and was eluted with o-dichlorobenzene under a pressure of 80 p.s.i.g. and at a flow rate of 1 ml./min. The highest molecular weight polyethylene eluted in o-dichlorobenzene had a molecular weight of 128,000 and was first indicated by the recording differential refractometer when 95.0 ml. had passed through the column. A maximum concentration of polyethylene (having a molecular weight of 12,600) appeared after 114.5 ml. had passed through the column and the lowest molecular weight polyethylene (2,100) recorded was observed after 130 ml. had passed through the column. Any desired narrower molecular weight spread portion of the above fractionated sample can be passed through the column again to obtain a curve showing its particular molecular weight distribution.

Example 30

Through the same column and under the same conditions as Example 35 was passed another higher average molecular weight sample of polyethylene in o-dichlorobenzene. The highest molecular weight polyethylene eluted in o-dichlorobenzene had a molecular weight of 650,000 and was indicated by the recording differential refractometer after 80 ml. had passed through the column. A peak concentration was recorded at a molecular weight of 51,000 after 102 ml. had passed through the column. The lowest molecular weight material was recorded after 121 ml. had passed through the column and it had a molecular weight of 6,000.

Example 31

Through the same column and under the same conditions as Example 35, was passed another sample of polyethylene dissolved in o-dichlorobenzene and having a higher average molecular weight. The highest molecular weight portion of the polyethylene in o-dichlorobenzene passed from the column first after 68 ml. had passed therethrough. This material had a molecular weight of $2.5 \times 10^6$. A peak concentration at a molecular weight of 180,000 was recorded after 92 ml. had passed through the column. The lowest molecular weight material was recorded after 138 ml. had passed through the column and it had a molecular weight of <2,000.

In a like manner, other polyethylenes in other suitable solvents may also be fractionated.

*Example 32*

The same packed column was used in this example as was used in Example 35. The operating temperature of the column was 55 degrees C. and the flow rate of eluant through the column was 1 ml./min. at 24 p.s.i.g. After flushing the column with tetrahydrofuran, a one milliliter sample of tetrahydrofuran containing 1⅓ percent by weight of polyvinyl chloride was introduced. The highest molecular weight portion of the sample was eluted first after 79 ml. had passed through the column. This polyvinyl chloride had a molecular weight of 410,000. A peak concentration was recorded after 108.4 ml. had passed through the column. This polyvinyl chloride had a molecular weight of 28,000. The lowest molecular weight material was recorded after 133 ml. had passed through the column and it had a molecular weight of 2,900.

In a like manner, other vinyl halides in the same or other suitable solvents may also be fractionated.

*Example 33*

Through the same column and under the same conditions as Example 38, was passed another sample of polyvinyl chloride in tetrahydrofuran. The highest molecular weight portion having a molecular weight of $>1.0 \times 10^6$ was detected by the recording differential refractometer after 64 ml. had passed through the column. A peak concentration was recorded after 99.0 ml. had passed through the column. This material had a molecular weight of 67,500. The lowest molecular weight material was recorded after 130 ml. had passed through the column and it had a molecular weight of 3,900.

*Example 34*

A column was prepared by utilizing suspension-polymerized beads of a heteroporous polymer prepared by crosslinking 30 parts of styrene with 10 parts of divinylbenzene in 15 parts of diethylbenzene and 45 parts of toluene as reaction diluents. The polymer beads were sized to pass a 140 mesh U.S. Sieve size screen and be retained on a 200 mesh U.S. Sieve size screen. The column was composed of 3 sections of stainless steel tubing having an inside diameter of 0.305 inch, each section of tubing being about 4 feet in length. These three sections were packed with the polymer above described and joined together with connectors of 0.02 inch I.D. to provide a packing length of about 12 feet. After flushing the packing with toluene, one milliliter samples of toluene each of which contained 1⅓ percent by weight of a particular polypropylene glycol were added separately to the inlet end of the column. The column was operated at 25 degrees C., a pressure of about 40 p.s.i.g. and a flow rate of 1 ml./min. The following tabulation will show the average molecular weight of each sample and the milliliters which had passed through the column when each sample first appeared, when the peak of each distribution was reached and when the sample was completely eluted.

| Av. mol. wt. of polypropylene glycol fraction | Milliliters of eluant to— | | |
|---|---|---|---|
| | First appearance | Peak | Disappearance |
| 4,000 | 25 | 29.5 | 40 |
| 2,000 | 27 | 32.4 | 35 |
| 1,100 | 30 | 34.9 | 37 |
| 750 | 32 | 36.8 | 42 |
| 400 | 35 | 39.5 | 45 |

In a like manner, other polyalkylene glycols in other suitable solvents may also be separated.

As already indicated by the examples, the present method is limited to the use of non-aqueous solvents and mixtures thereof as eluants.

Therefore, in a manner similar to the foregoing examples, solvents such as perchloroethylene, toluene, o-dichlorobenzene, tetrahydrofuran, tetrahydronaphalene and the like can be used as eluants for the fractionation of polymers into various molecular weight fractions.

A solvent to be used as an eluant most advantageously is one that has some solvency for the linear analogue of the crosslinked heteroporous polymer being used for column packing. For example, tetrahydrofuran which dissolves polystyrene can be used as an eluant on columns packed with porous crosslinked polystyrene particles. Another related criterion upon which to base the choice of solvents is that of polarity. Thus, the polarity of the solvent should preferably match closely that of the porous polymer packing so that adsorption and partition effects are minimized.

What is claimed is:

1. In a method of separation of soluble substances which comprises adding to the inlet end of a packed column of a heteroporous resin a solution of a material to be fractionated in a solvent, eluting the column with added quantities of the solvent and collecting the fractions of the substance to be separated from the exit of the bed, the improvement which comprises utilizing a non-aqueous solution of a polymer and an insoluble, rigid, non-polar heteroporous resin having pores with an average or effective diameter of from about 2 millimicrons to about two cirons as the heteroporous resin within the column, the polarity of the solvent and the heteroporous resin being such that adsorption and partition effects are minimized.

2. A method of claim 1 wherein said heteroporous resinous material is a copolymer of styrene with at least 10 percent divinyl benzene and prepared in the presence of a diluent which is a solvent for the monomers but a non-solvent for the copolymer.

3. A method of claim 1 wherein said heteroporous resinous material is a copolymer of ethyl styrene with at least 10 percent divinyl benzene and prepared in the presence of a diluent which is a solvent for the monomers but a non-solvent for the copolymer.

4. A method of claim 1 wherein said polymer to be fractionated is a polymer of an alkenyl aromatic compound.

5. A method of claim 1 wehrein said polymer to be fractionated is a polyalkylene glycol.

6. A method of claim 1 wherein said polymer to be fractionated is a polyethylene.

7. A method of claim 1 wherein said polymer to be fractionated is a polyvinyl halide.

8. A method of claim 1 wherein said polymer to be fractionated is polystyrene.

9. A method of claim 1 wherein said polymer to be fractionated is polyvinyl chloride.

10. A method according to claim 2 wherein the diluent for the heteroporous polymer was toluene.

11. A method according to claim 2 wherein the diluent for the heteroporous polymer was diethylbenzene.

12. A method according to claim 2 wherein the diluent for the heteroporous polymer was a mixture of toluene and diethylbenzene.

13. A method according to claim 2 wherein the diluent for the heteroporous polymer was a mixture of isoamyl alcohol and diethyl benzene.

14. A method according to claim 2 wherein the diluent for the heteroporous polymer was cyclohexane.

15. A method according to claim 1 wherein said heteroporous polymer had a particle size less than 140 mesh.

16. A method according to claim 1 wherein said heteroporous polymer is in the form of spherical particles which are less than 140 mesh in size.

17. A method for the fractionation of high polymers which comprises eluting with a non-aqueous solvent a non-aqueous solution of the high polymer in the solvent to be fractionated through a packed column of a heteroporous, non-polar, polymeric material which is insoluble in the non-aqueous solvent employed, collecting fractions of the eluant passing from the column and determining the quantity of polymer removed in the various eluted fractions, the polarity of the solvent and the heteroporous resin being such that adsorption and partition effects are minimized.

References Cited
UNITED STATES PATENTS

| | | | |
|---|---|---|---|
| 2,462,564 | 2/1949 | Skeen | 260—96 |
| 2,825,721 | 3/1958 | Hogan et al. | 260—88.2 |
| 2,911,362 | 11/1959 | Wheaton | 210—31 |
| 2,974,178 | 3/1961 | Hwa | 260—674 |

JOSEPH L. SCHOFER, *Primary Examiner.*

M. WOLK, *Examiner.*

E. G. WHITEY, J. A. DONAHUE, *Assistant Examiners.*